US012183534B2

(12) United States Patent
Dai et al.

(10) Patent No.: US 12,183,534 B2
(45) Date of Patent: Dec. 31, 2024

(54) HIGH-VOLTAGE DIRECT CURRENT RELAY CAPABLE OF IMPROVING INSULATION CAPABILITY

(71) Applicant: Xiamen Hongfa Electric Power Controls Co., Ltd., Xiamen (CN)

(72) Inventors: Wenguang Dai, Xiamen (CN); Meng Wang, Xiamen (CN); Dapeng Fu, Xiamen (CN); Songsheng Chen, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 121 days.

(21) Appl. No.: 17/983,495

(22) Filed: Nov. 9, 2022

(65) Prior Publication Data

US 2023/0154695 A1 May 18, 2023

(30) Foreign Application Priority Data

Nov. 17, 2021 (CN) ......................... 202111363654.7

(51) Int. Cl.
*H01H 9/32* (2006.01)
*H01H 1/06* (2006.01)
*H01H 9/02* (2006.01)

(52) U.S. Cl.
CPC ................ *H01H 9/32* (2013.01); *H01H 1/06* (2013.01); *H01H 9/02* (2013.01)

(58) Field of Classification Search
CPC .. H01H 9/32; H01H 9/02; H01H 1/06; H01H 50/36; H01H 50/54; H01H 50/2009;
(Continued)

(56) References Cited

U.S. PATENT DOCUMENTS 2,729,722 A 1/1956 Nelsen
11,462,379 B2 * 10/2022 Werner .................. H01H 33/08
2020/0321178 A1 10/2020 Huang et al.

FOREIGN PATENT DOCUMENTS

CN 113410101 A * 9/2021
JP 2014-116165 A 6/2014
(Continued)

OTHER PUBLICATIONS

Extended European Search Report dated Mar. 31, 2023, in connection with European Application No. 22275143.0.
(Continued)

*Primary Examiner* — Anthony R Jimenez
(74) *Attorney, Agent, or Firm* — Wolf, Greenfield & Sacks, P.C.

(57) ABSTRACT

A high-voltage direct current relay capable of improving insulation capability, including a ceramic cover, two fixed contacts for respectively providing inflow and outflow current and one movable contact spring; a through hole for assembling the fixed contact being provided at a top wall of the ceramic cover; one segment of a body of the fixed contact being in clearance fitted with the through hole of the ceramic cover, a first step surface downward being provided at an outer peripheral wall of one segment of the body of the fixed contact, at a corresponding position, a second step surface upward being provided at an inner peripheral wall of the through hole of the ceramic cover, and the projections of the first step surface and the second step surface on the horizontal plane having an overlapped region.

15 Claims, 13 Drawing Sheets

(58) Field of Classification Search
CPC .... H01H 50/02; H01H 50/0285; H01H 50/04; H01H 2033/00; H01H 2033/53; H01H 2223/00; H01H 2223/002; H01H 2223/044; H01H 9/0242; H01H 9/0264; H01H 9/04; H01H 9/042; H01H 9/045; H01H 9/046; H01H 9/20; H01H 9/22; H01H 9/30; H01H 9/34; H01H 1/64
USPC .......................................................... 200/293
See application file for complete search history.

(56) References Cited

FOREIGN PATENT DOCUMENTS

| | | | | |
|---|---|---|---|---|
| JP | 2021-051978 | A | 4/2021 | |
| WO | WO-2016002116 | A1 * | 1/2016 | ............. H01H 50/38 |
| WO | WO 2019/201806 | A1 | 10/2019 | |

OTHER PUBLICATIONS

Japanese Decision to Grant mailed Apr. 2, 2024, in connection with Japanese Application No. 2022-183357, and English translation thereof.

* cited by examiner

HIGH-VOLTAGE DIRECT CURRENT RELAY CAPABLE OF IMPROVING INSULATION CAPABILITY

CROSS-REFERENCE TO RELATED APPLICATIONS

This application claims priority to Chinese Application No. 202111363654.7, filed on Nov. 17, 2021, which is incorporated herein by reference in its entirety.

TECHNICAL FIELD

The present disclosure relates to the technical field of relays, and particularly, to a high-voltage direct current relay capable of improving insulation capability.

BACKGROUND

A relay is a kind of electronic control device, which has a control system (also referred to as an input loop) and a controlled system (also referred to as an output loop), is usually applied to an automatic control circuit, and is actually an "automatic switch" that controls a relatively large current with a relatively small current. Therefore, the relay plays the role of automatic adjustment, safety protection, conversion circuit and the like in the circuit. A high-voltage direct current relay is a kind of relay, one kind of high-voltage direct current relay in the prior art adopts a movable contact spring direct action structure, that is, to realize closing and breaking between movable and fixed contacts by utilizing the fit between two fixed contacts and one movable contact spring, and in this high-voltage direct current relay, two fixed contacts are usually mounted on the top of a ceramic or plastic case and the bottom ends of the two fixed contacts usually extend inside the cavity of the ceramic or plastic case. According to the actual application of vehicle, energy storage, charging pile, marine electronics, avionics and the like, the contacts need to be connected under load, disconnected under load, and switched under load so as to realize the "switch" function, and contacts inside (i.e., inside the cavity of the ceramic or plastic case) may suffer from arc ablation in all these processes. After the arc ablation of the direct current relay, the pollutant contacts part of the inner wall due to arc ablation and splashing, which causes that the original insulated ceramic or plastic case is polluted and forms short circuit of insulation and insulation reduction.

SUMMARY

The object of the present disclosure is to overcome the deficiency in the prior art and provide a high-voltage direct current relay capable of improving insulation capability, and the occurrence of the phenomena of short circuit of insulation and insulation reduction caused by arc splashing can be reduced through the structural improvement; also, the creepage distance is increased, and the insulation resistance is increased; thusly the arc extinction requirement for high voltage and large current can be met; and meanwhile, the structure of the product is simple, and the production cost may not greatly increase.

The technical solution adopted by the present disclosure to solve its technical problem is that, a high-voltage direct current relay capable of improving insulation capability includes a ceramic cover, two fixed contacts for respectively providing inflow and outflow current, and one movable contact spring; the two fixed contacts are respectively mounted at a top wall of the ceramic cover, lower parts of the two fixed contacts respectively extend inside a cavity of the ceramic cover, and two ends of the movable contact spring respectively fit with bottom ends of the two fixed contacts; the ceramic cover has the top wall and a side wall, and a through hole for assembling a fixed contact is provided at the top wall of the ceramic cover; the fixed contact is constituted of a head and a body; the head of the fixed contact is connected on the top wall of the ceramic cover, and causes one segment of the body of the fixed contact to correspond into a through hole of the ceramic cover; one segment of the body of the fixed contact is in clearance fit with a through hole of the ceramic cover, a first step surface downward is provided at an outer peripheral wall of one segment of the body of the fixed contact, at a corresponding position, a second step surface upward is provided at an inner peripheral wall of a through hole of the ceramic cover, a contour of a projection of one segment of the inner peripheral wall above the second step surface of a through hole of the ceramic cover on a horizontal plane is larger than a contour of a projection of one segment of the outer peripheral wall above the first step surface of one of segments of the body of the fixed contact on a horizontal plane, a contour of a projection of one segment of the outer peripheral wall above the first step surface of one of segments of body of the fixed contact on the horizontal plane is larger than a contour of a projection of one segment of the inner peripheral wall below the second step surface of a through hole of the ceramic cover on the horizontal plane, a contour of a projection of one segment of the inner peripheral wall below the second step surface of a through hole of the ceramic cover on the horizontal plane is larger than a contour of a projection of one segment of outer peripheral wall below the first step surface of one of segments of the body of the fixed contact on the horizontal plane, and a distance between the first step surface and the second step surface is larger than zero, so as to prevent arc spatter from entering into a region of fitting clearance between a fixed contact and a through hole of the ceramic cover above a location where the first step surface fits with the second step surface utilizing staggered fitting between the first step surface and the second step surface, thereby improving insulation capability.

In an embodiment, the first step surface and the second step surface are both planes parallel to the horizontal plane.

In an embodiment, the first step surface and the second step surface are both inclined surfaces having same included angles with the horizontal plane respectively.

In an embodiment, the first step surface and the second step surface are both inclined surfaces, and an included angle between the first step surface and the horizontal plane is different from an included angle between the second step surface and the horizontal plane.

In an embodiment, one of the first step surface and the second step surface is a plane parallel to the horizontal plane, and the other of the first step surface and the second step surface is an inclined surface having an included angle with the horizontal plane.

In an embodiment, a horizontal section of the fixed contact is in circle, and a horizontal section of a through hole of the ceramic cover is also in circle, a diameter of one segment of the inner peripheral wall above the second step surface of a through hole of the ceramic cover is larger than a diameter of one segment of the outer peripheral wall of above the first step surface of one of segments of the body of the fixed contact, a diameter of one segment of the outer peripheral wall above the first step surface of one of segments of the body of the fixed contact is larger than a diameter of one segment of the inner peripheral wall below the second step surface of a through hole of the ceramic cover, a diameter of one segment of the inner peripheral wall below the second step surface of a through hole of the ceramic cover is larger than a diameter of one segment of the outer peripheral wall below the first step surface of one of segments of the body of the fixed contact; and a distance between the first step surface and the second step surface is larger than zero.

In an embodiment, one first step surface downward is provided at the outer peripheral wall of one of segments of the body of the fixed contact, and at a corresponding position, one second step surface upward is provided at the inner peripheral wall of a through hole of the ceramic cover.

In an embodiment, a plurality of first step surfaces downward are provided at the outer peripheral wall of one of segments of the body of the fixed contact, and diameters of the segments of the outer peripheral wall above respective first step surfaces gradually decrease from top to bottom; and a plurality of second step surfaces are respectively provided in the inner peripheral wall of a through hole of the ceramic cover at positions corresponding to a plurality of first step surfaces, and the plurality of second step surfaces are in respective correspondence to the plurality of first step surfaces.

In an embodiment, the first step surface is integrally formed into one of segments of the body of the fixed contact.

In an embodiment, an annular element is embedded in one of segments of the body of the fixed contact at a corresponding position; and a bottom surface of the annular element constitutes the first step surface.

The beneficial effects of the present disclosure compared with the prior art are as below.

In the present disclosure, one of segments of the body of the fixed contact is in clearance fit with a through hole of the ceramic cover, the first step surface downward is provided at the outer peripheral wall of one of segments of the body of the fixed contact, at the corresponding position, the second step surface upward is provided at the inner peripheral wall of a through hole of the ceramic cover, the contour of the projection of one segment of the inner peripheral wall above the second step surface of a through hole of the ceramic cover on the horizontal plane is larger than the contour of the projection of one segment of the outer peripheral wall above the first step surface of one of segments of the body of the fixed contact on the horizontal plane, the contour of the projection of one segment of the outer peripheral wall above the first step surface of one of segments of the body of the fixed contact on the horizontal plane is larger than the contour of the projection of one segment of the inner peripheral wall below the second step surface of a through hole of the ceramic cover on the horizontal plane, the contour of the projection of one segment of the inner peripheral wall below the second step surface of a through hole of the ceramic cover on the horizontal plane is larger than the contour of the projection of one segment of outer peripheral wall below the first step surface of one of segments of the body of the fixed contact on the horizontal plane, and the distance between the first step surface and the second step surface is larger than zero, so as to prevent the arc spatter from entering into the region of the fitting clearance between the fixed contact and the through hole of the ceramic cover above the location where the first step surface fits with the second step surface by utilizing the staggered fitting between the first step surface and the second step surface, thereby improving insulation capability. Based on the structure of the present disclosure, the first step surface downward is formed by utilizing the fixed contact, which causes one segment of the fixed contact above the first step surface forms a projection towards the inner peripheral wall of the through hole of the ceramic cover with regards to one segment of the fixed contact below the first step surface; the second step surface upward is formed by utilizing the inner peripheral wall of the through hole of the ceramic cover, which causes one segment of the inner peripheral wall of the through hole of the ceramic cover below the second step surface forms a projection towards the peripheral wall of the fixed contact with regards to one segment of the inner peripheral wall of the through hole of the ceramic cover above the second step surface, the above two projections play the role of protective protrusion, and short circuit of insulation and insulation reduction caused by arc splashing can be reduced due to the staggered design of the two projections; at the same time, the creepage is increased and the insulation resistance is increased, which can meet the arc extinction requirement for high voltage and high current, and at meanwhile, the production cost of the product may not greatly increase; and in the present disclosure, since the passageway of the fitting clearance between the fixed contact and the through hole of the ceramic cover is bent and thereby the arc spatter is prevented from entering into the region of the fitting clearance between the fixed contact and the through hole of the ceramic cover above the location where the first step surface fits with the second step surface by adopting the fitting between first step surface and second step surface, in this structure, the parts are simple to form, the assembly is simple, and the insulation path is relatively long, that is, the longer the creepage distance is, the larger the insulation resistance is, and the smaller the leakage current is, the safer the relay is.

The present disclosure will be further described in detail below with reference to the accompanying drawings and embodiments; however, a high-voltage direct current relay capable of improving insulation capability of the present disclosure is not limited to the embodiments.

DETAILED DESCRIPTION

First Embodiment

Figure 1:
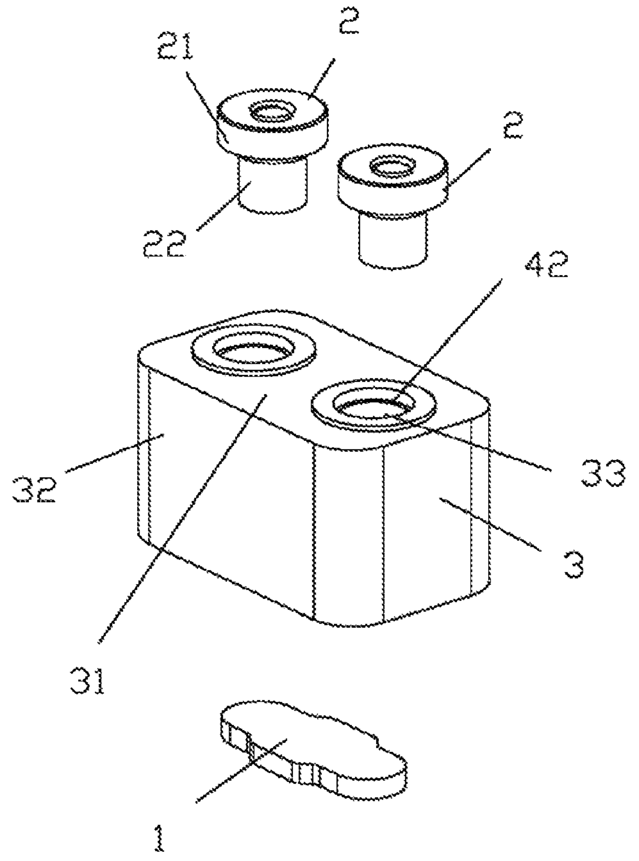
FIG. 1 is an exploded schematic view of a partial structure according to the first embodiment of the present disclosure.
Figure 2:
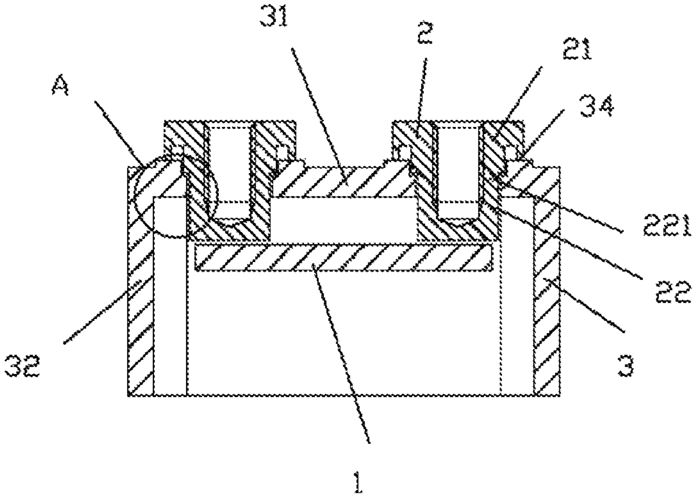
FIG. 2 is a sectional view of the partial structure according to the first embodiment of the present disclosure.
Figure 3:
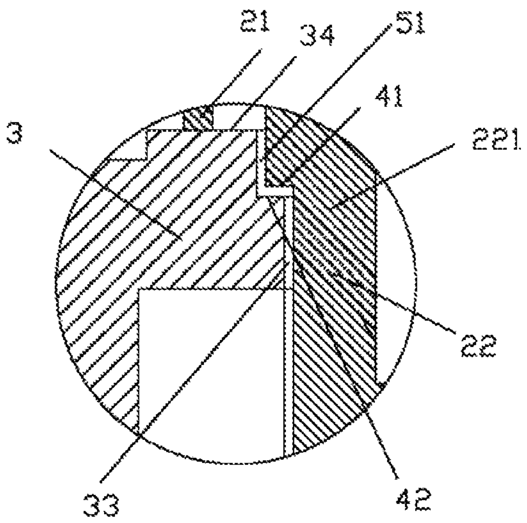
FIG. 3 is an enlarged schematic view of a region A in FIG. 2.
Figure 4:
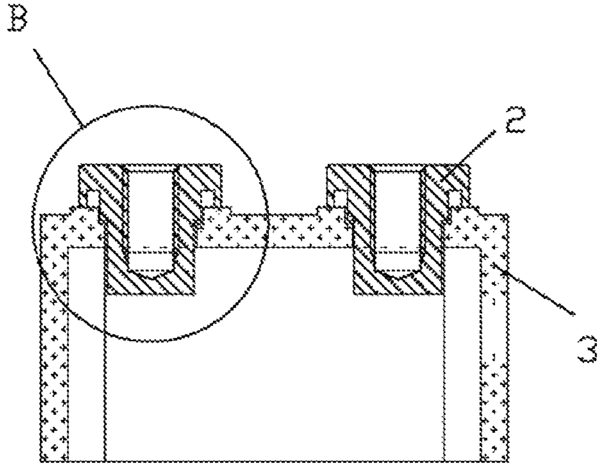
FIG. 4 is a sectional view in which a ceramic cover fits with a fixed contact according to the first embodiment of the present disclosure.

Referring to FIG. 1 to FIG. 5, a high-voltage direct current relay capable of improving insulation capability of the present disclosure includes a ceramic cover 3, two fixed contacts 2 for respectively providing inflow and outflow current and one movable contact spring 1; the ceramic cover 3 has a top wall 31 and a side wall 32, the two fixed contacts 2 are respectively mounted at the top wall 31 of the ceramic cover 3, the lower parts of the two fixed contacts 2 respectively extend inside the cavity of the ceramic cover 3, the two ends of the movable contact spring 1 are respectively fitted with the bottom ends of the two fixed contacts 2; a through hole 33 for assembling the fixed contact 2 is provided at the top wall 31 of the ceramic cover 3; the fixed contact 2 is constituted of a head 21 and a body 22, and the peripheral contour of the head 21 is larger than that of the body 22; the head 21 of the fixed contact 2 is connected on the top wall 31 of the ceramic cover 3, specifically connected at the upper edge of the hole 34 of the through hole 33, and causes one segment 221 of the body 22 of the fixed contact 2 to correspond into the through hole 33 of the ceramic cover 3; one segment 221 of the body of the fixed contact 2 is in clearance fitted with the through hole 33 of the ceramic cover 3, one first step surface 41 downward is provided at the outer peripheral wall of one segment 221 of the body 22 of the fixed contact 2, at the corresponding position, one second step surface 42 upward is provided at the inner peripheral wall of the through hole 33 of the ceramic cover 3, the contour of the projection of one segment of the inner peripheral wall above the second step surface 42 of the through hole 33 of the ceramic cover 3 on a horizontal plane is larger than the contour of the projection of one segment of the outer peripheral wall above the first step surface 41 of one segment 221 of the body of the fixed contact 2 on the horizontal plane, the contour of the projection of one segment of the outer peripheral wall above the first step surface 41 of one segment 221 of the body of the fixed contact 2 on the horizontal plane is larger than the contour of the projection of one segment of the inner peripheral wall below the second step surface 42 of the through hole 33 of the ceramic cover 3 on the horizontal plane, the contour of the projection of one segment of the inner peripheral wall below the second step surface 42 of the through hole 33 of the ceramic cover 3 on the horizontal plane is larger than the contour of the projection of one segment of the outer peripheral wall below the first step surface 41 of one segment 221 of the body of the fixed contact 2 on the horizontal plane, and the distance between the first step surface 41 and the second step surface 42 is larger than zero, so as to prevent arc spatter from entering into a region 51 of the fitting clearance between the fixed contact 2 and the through hole 33 of the ceramic cover 3 above the location where the first step surface 41 fits with the second step surface 42 utilizing the staggered fitting between the first step surface 41 and the second step surface 42, thereby improving insulation capability.

It is noted that, in the present disclosure, definition representing orientation such as “upper”, “middle”, “lower”, “inner”, “outer”, “top” and the like only represent the relative positional relationship between components or structures in components in a certain state, for example, the top wall 31 of the ceramic cover 3 refers to the wall at the top position in the state when the ceramic cover opens downward.

In the present embodiment, the first step surface 41 and the second step surface 42 are both planes parallel to the horizontal plane.

Figure 5:
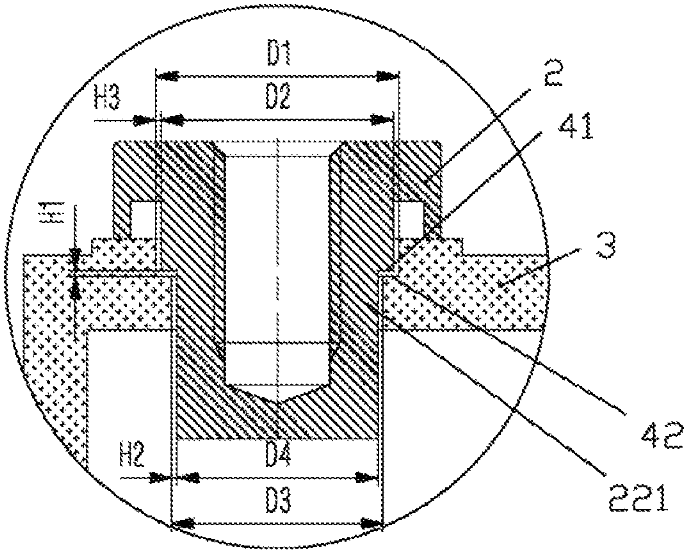
FIG. 5 is an enlarged schematic view of a region B in FIG. 4.

In the present embodiment, as shown in FIG. 5, the horizontal section of the fixed contact 2 is in circle, the horizontal section of the through hole 33 of the ceramic cover 3 is also in circle, the diameter D1 of one segment of the inner peripheral wall above the second step surface of the through hole 33 of the ceramic cover 3 (i.e. the contour of the projection on the horizontal plane) is larger than the diameter D2 of one segment of the outer peripheral wall above the first stepped surface of one segment of the body of the fixed contact (i.e. the contour of the projection on the horizontal plane, same as below), the diameter D2 of one segment of the outer peripheral wall above the first step surface of one segment of the body of the fixed contact is larger than the diameter D3 of one segment of the inner peripheral wall below the second step surface of the through hole of the ceramic cover, and the diameter D3 of one segment of the inner peripheral wall below the second step surface of the through hole of the ceramic cover is larger than the diameter D4 of one segment of the outer peripheral wall below the first step surface of one segment of the body of the fixed contact; and the distance H1 between the first step surface and the second step surface is larger than zero. In this way, it is also guaranteed that H1 is larger than zero, H2 is larger than zero and H3 is larger than zero.

In the present embodiment, the first step surface 41 is integrally formed into one segment 221 of the body 22 of the fixed contact 2.

According to the high-voltage direct current relay capable of improving insulation capability of the present disclosure, one segment 221 of the body 22 of the fixed contact 2 is in clearance fitted with the through hole 33 of the ceramic cover 3, and the first step surface 41 downward is provided at the outer peripheral wall of one segment 221 of the body 22 of the fixed contact 2, at the corresponding position, the second step surface 42 upward is provided at the inner peripheral wall of the through hole 33 of the ceramic cover 3, the contour of the projection of one segment of the inner peripheral wall above the second step surface 42 of the through hole 33 of the ceramic cover 3 on the horizontal plane is larger than the contour of the projection of one segment of the outer peripheral wall above the first step surface 41 of one segment 221 of the body of the fixed contact 2 on the horizontal plane, the contour of the projection of one segment of the outer peripheral wall above the first step surface 41 of one segment 221 of the body of the fixed contact 2 on the horizontal plane is larger than the contour of the projection of one segment of the inner peripheral wall below the second step surface 42 of the through hole 33 of the ceramic cover 3 on the horizontal plane, the contour of the projection of one segment of the inner peripheral wall below the second step surface 42 of the through hole 33 of the ceramic cover 3 on the horizontal plane is larger than the contour of the projection of one segment of the outer peripheral wall below the first step surface 41 of one segment 221 of the body of the fixed contact 2 on the horizontal plane, and the distance between the first step surface 41 and the second step surface 42 is larger than zero, so that after the fixed contact 2 forms the first step surface 41 and the through hole of the ceramic cover forms the second step surface, the fixed contact 2 and the through hole 33 of the ceramic cover 3 is still in clearance fitted and the projections of the first step surface and the second step surface on the horizontal plane form an overlap, so as to prevent the arc spatter from entering into the region of the fitting clearance between the fixed contact and the through hole of the ceramic cover above the location where the first step surface fits with the second step surface by utilizing the staggered fitting between the first step surface 41 and the second step surface 42, thereby improving insulation capability. Based on this structure of the present disclosure, the first step surface 41 downward is formed by utilizing the fixed contact, which causes one segment of the fixed contact above the first step surface forms a projection towards the direction of the inner peripheral wall of the through hole of the ceramic cover with regards to one segment of the fixed contact below the first step surface, and then the second step surface 42 upward is formed by utilizing the inner peripheral wall of the through hole of the ceramic cover, which causes one segment of the inner peripheral wall of the through hole of the ceramic cover below the second step surface forms a projection towards the peripheral wall direction of the fixed contact with regards to one segment of the inner peripheral wall of the through hole of the ceramic cover above the second step surface, the above two projections play the role of protective protrusion, and short circuit of insulation and insulation reduction caused by arc splashing may be reduced since the two projections are staggerly designed; at the same time, the creepage is increased and the insulation resistance is increased, which may meet the arc extinction requirement for high voltage and high current, and at meanwhile, the production cost of the product may not greatly increase; and in the present disclosure, since the passageway of the fitting clearance between the fixed contact and the through hole of the ceramic cover is bent (i.e. not straight), and thusly the arc spatter is prevented from entering into the region of the fitting clearance between the fixed contact and the through hole of the ceramic cover above the location where the first step surface 41 fits with the second step surface 42 by adopting the fitting between first step surface and second step surface, in this structure, the parts are simple to form, the assembly is simple, and the insulation path is relatively long, that is, the creepage distance is longer, the insulation resistance is larger, and the leakage current is smaller, and the relay product is safer.

Second Embodiment

Figure 6:
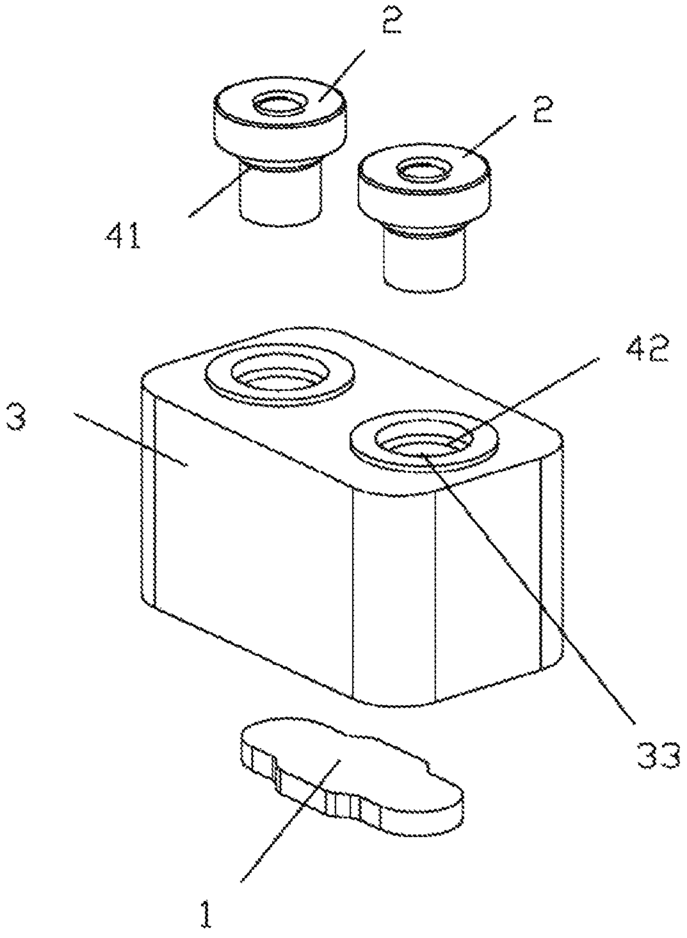
FIG. 6 is an exploded schematic view of a partial structure according to the second embodiment of the present disclosure.
Figure 7:
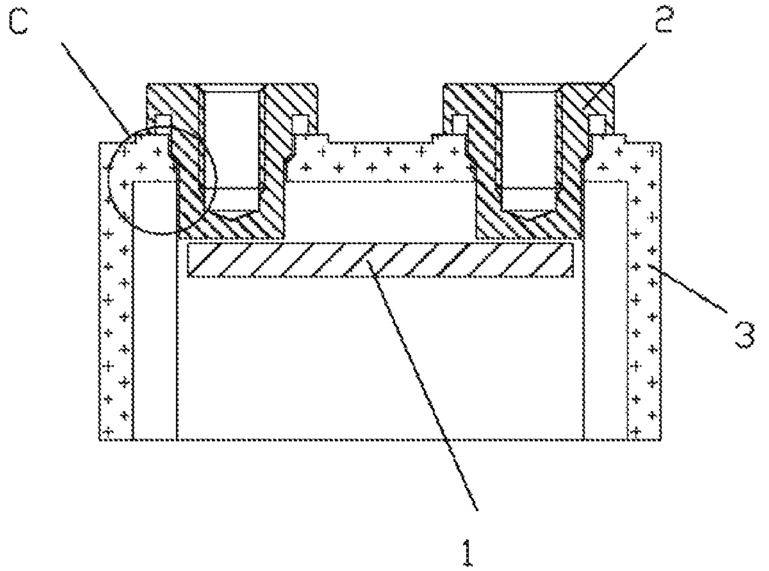
FIG. 7 is a sectional view of the partial structure according to the second embodiment of the present disclosure.
Figure 8:
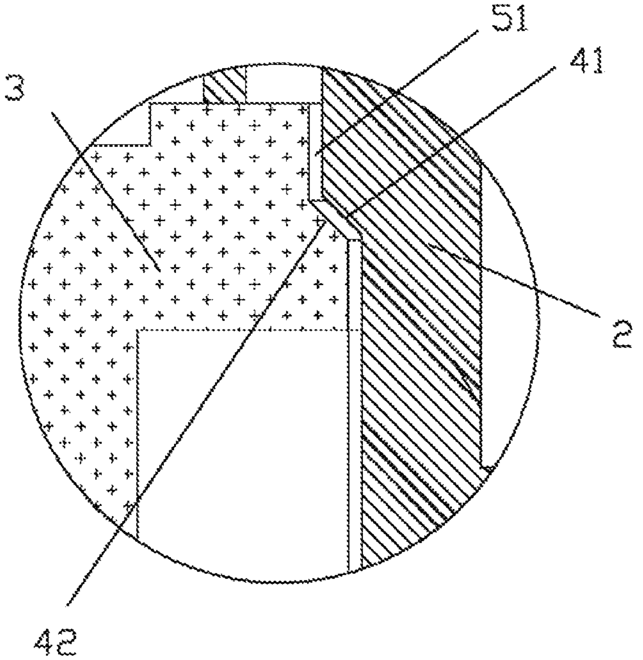
FIG. 8 is an enlarged schematic view of a region C in FIG. 7.

Referring to FIG. 6 to FIG. 8, which show the high-voltage direct current relay capable of improving insulation capability of the present disclosure, and the difference from the first embodiment lies in that the first step surface 41 and the second step surface 42 are both inclined surfaces which have the same included angles relative to the horizontal plane.

Third Embodiment

Figure 9:
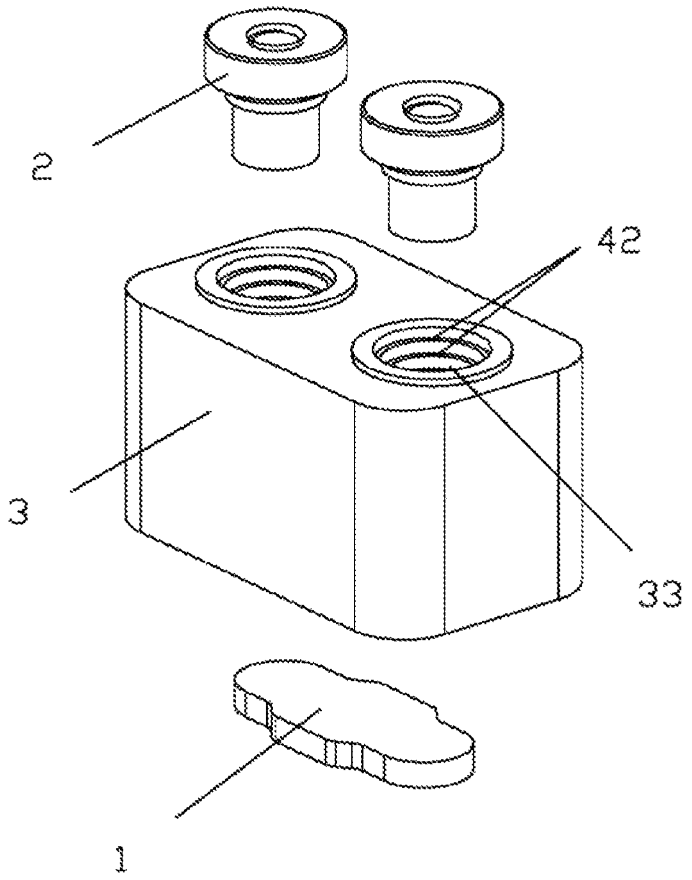
FIG. 9 is an exploded schematic view of a partial structure according to the third embodiment of the present disclosure.
Figure 10:
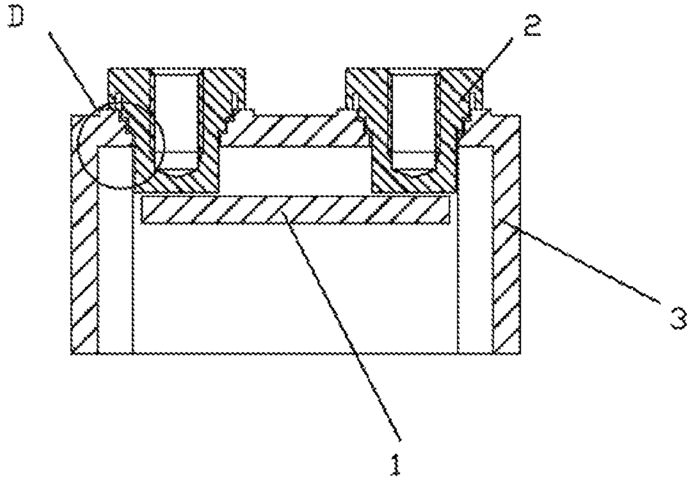
FIG. 10 is a sectional view of the partial structure according to the third embodiment of the present disclosure.
Figure 11:
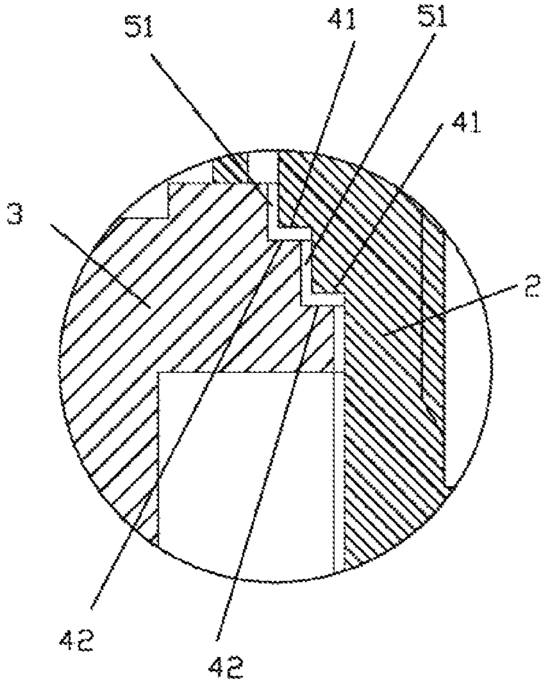
FIG. 11 is an enlarged schematic view of a region D in FIG. 10.

Referring to FIG. 9 to FIG. 11, which show the high-voltage direct current relay capable of improving insulation capability of the present disclosure, and the difference from the first embodiment lies in that two first step surfaces 41 downward are provided at the outer peripheral wall of one segment 221 of the body of the fixed contact 2, and the diameters of the segments of the outer peripheral wall above the two first step surfaces 41 gradually decrease from top to bottom; at the positions corresponding to the two first step surfaces 41, two second step surfaces 42 are respectively provided in the inner peripheral wall of the through hole 33 of the ceramic cover 3, and the two second step surfaces 42 are in respective correspondence to the two first step surfaces 41.

Fourth Embodiment

Figure 12:
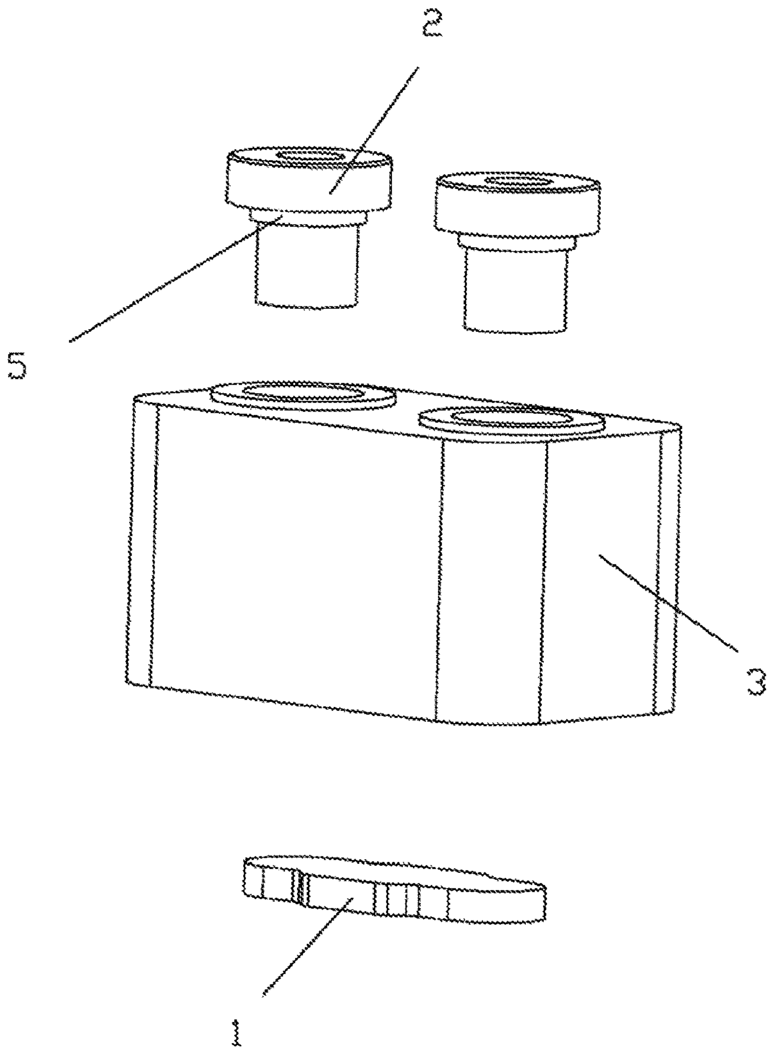
FIG. 12 is an exploded schematic view of a partial structure according to the fourth embodiment of the present disclosure.
Figure 13:
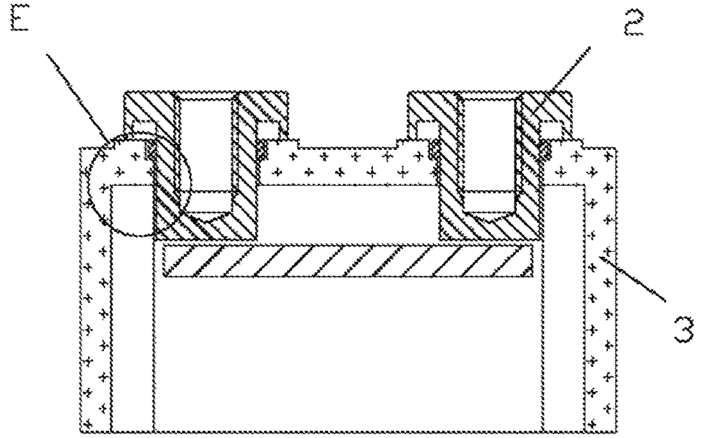
FIG. 13 a sectional view of the partial structure according to the fourth embodiment of the present disclosure.
Figure 14:
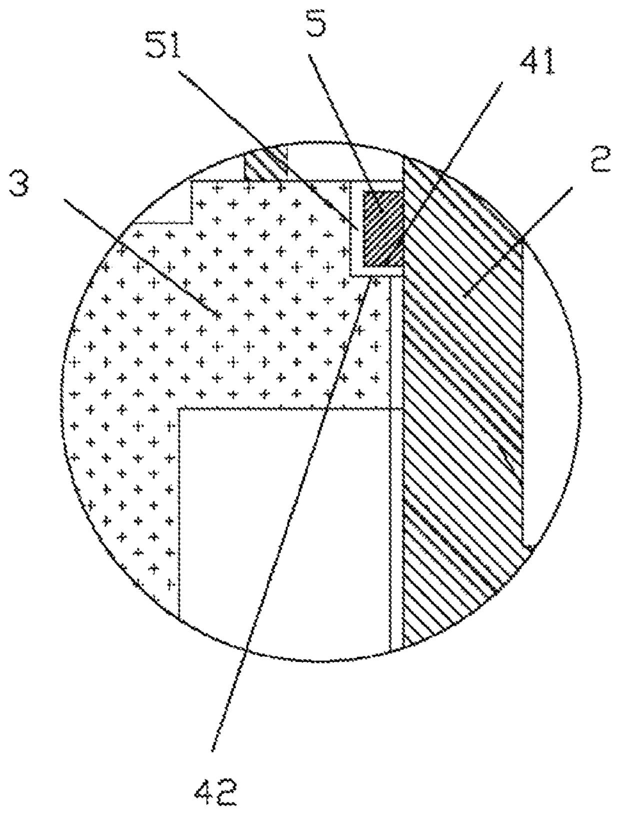
FIG. 14 is an enlarged schematic view of a region E in FIG. 13.

Referring to FIG. 12 to FIG. 14, which show the high-voltage direct current relay capable of improving insulation capability of the present disclosure, and the difference from the first embodiment lies in that in an annular element 5 is embedded at one segment 221 of the body 22 of the fixed contact 2 at the corresponding position; and the bottom surface of the annular element 5 constitutes the first step surface 41.

Fifth Embodiment

Figure 15:
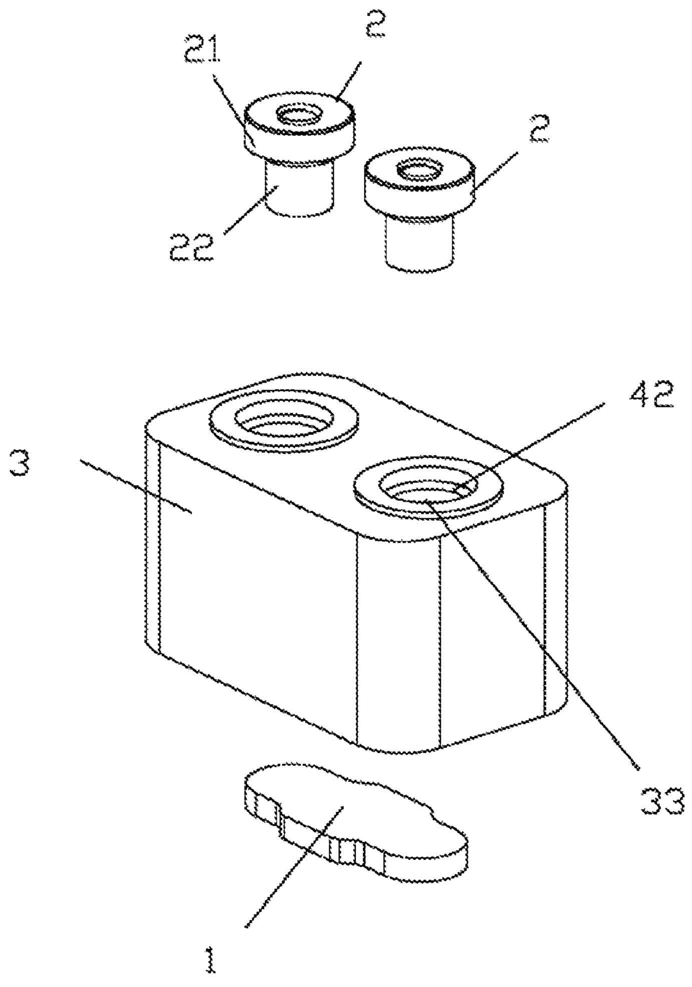
FIG. 15 is an exploded schematic view of a partial structure according to the fifth embodiment of the present disclosure.
Figure 16:
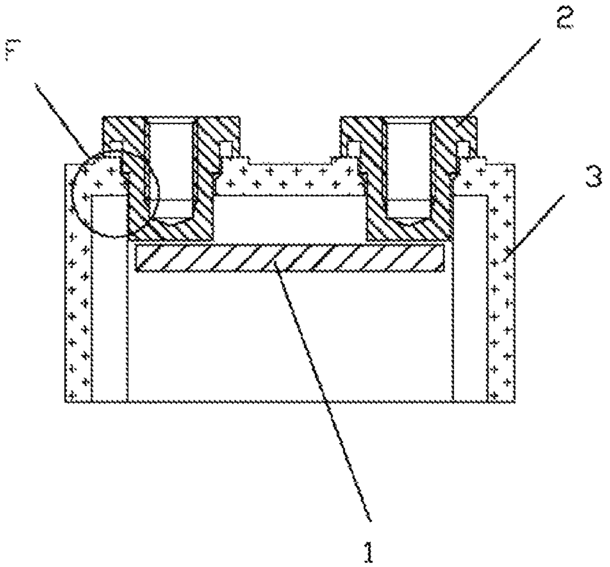
FIG. 16 is a sectional view of the partial structure according to the fifth embodiment of the present disclosure.
Figure 17:
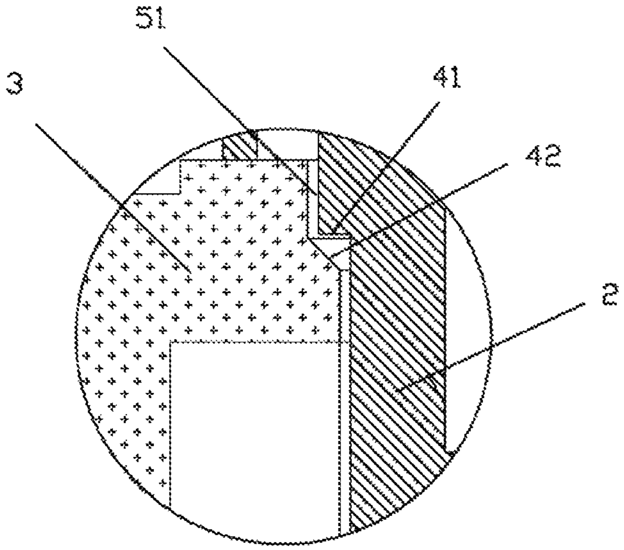
FIG. 17 is an enlarged schematic view of a region F in FIG. 16.

Referring to FIG. 15 to FIG. 17, which shows the high-voltage direct current relay capable of improving insulation capability of the present disclosure, and the difference from the first embodiment lies in that the second step surface 42 of the ceramic cover 3 is an inclined surface having an included angle relative to the horizontal plane, and the first step surface 41 of the fixed contact 2 is still a plane parallel to the horizontal plane.

Sixth Embodiment

Figure 18:
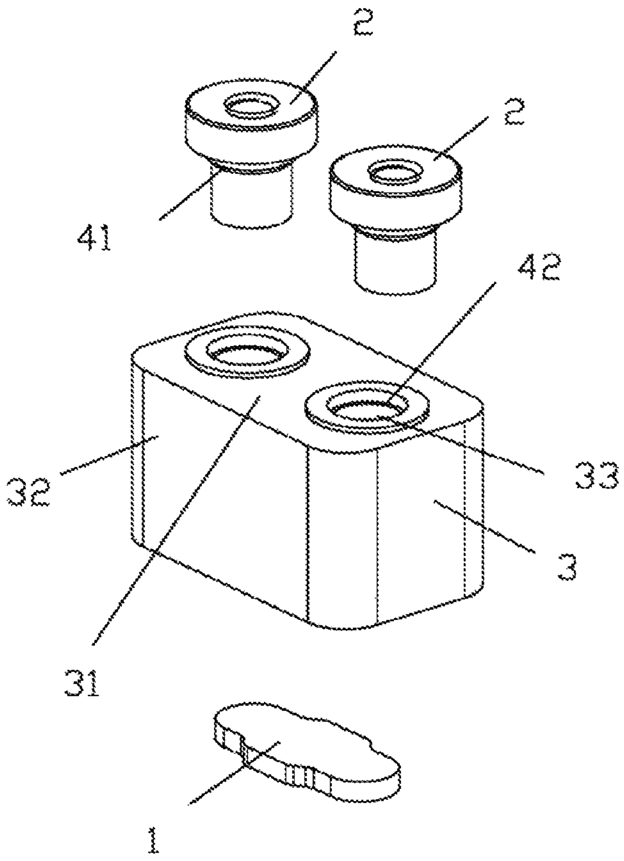
FIG. 18 is an exploded schematic view of a partial structure according to the sixth embodiment of the present disclosure.
Figure 19:
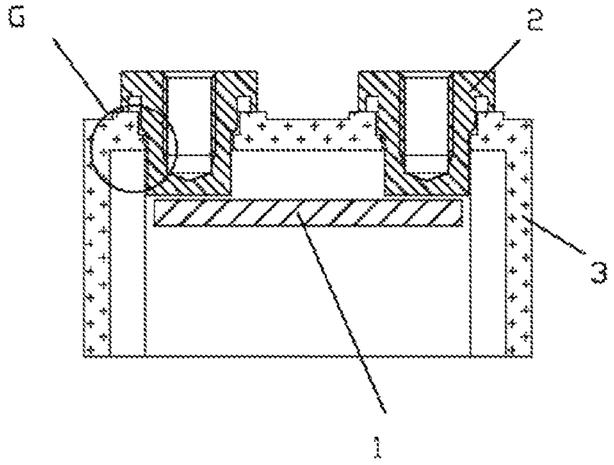
FIG. 19 is a sectional view of the partial structure according to the sixth embodiment of the present disclosure.
Figure 20:
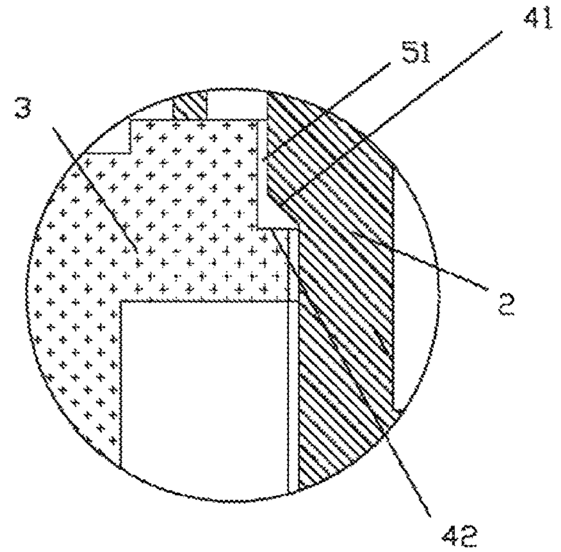
FIG. 20 is an enlarged schematic view of a region G in FIG. 19.

Referring to FIG. 18 to FIG. 20, which show the high-voltage direct current relay capable of improving insulation capability of the present disclosure, and the difference from the first embodiment lies in that the first step surface 41 of the fixed contact 2 is an inclined surface having an included angle relative to the horizontal plane, and the second step surface 42 of the ceramic cover 3 is still a plane parallel to the horizontal plane.

Seventh Embodiment

Figure 21:
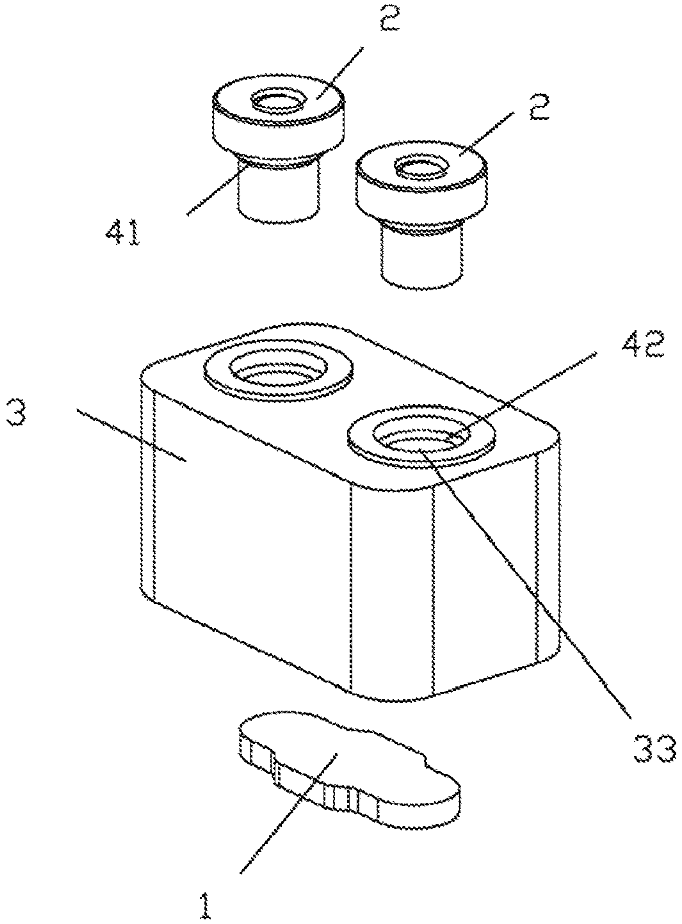
FIG. 21 is an exploded schematic view of a partial structure according to the seventh embodiment of the present disclosure.
Figure 22:
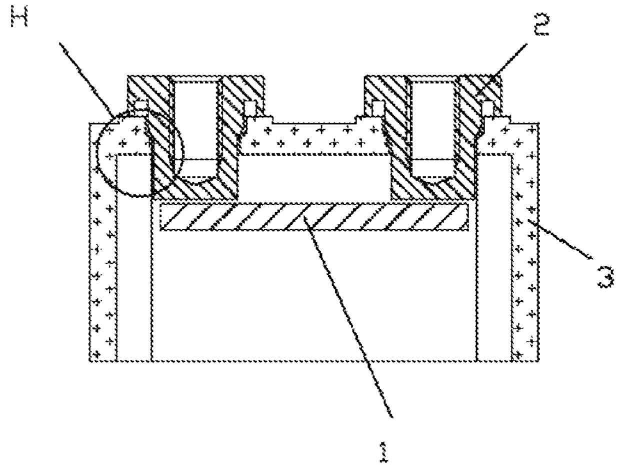
FIG. 22 is a sectional view of the partial structure according to the seventh embodiment of the present disclosure.
Figure 23:
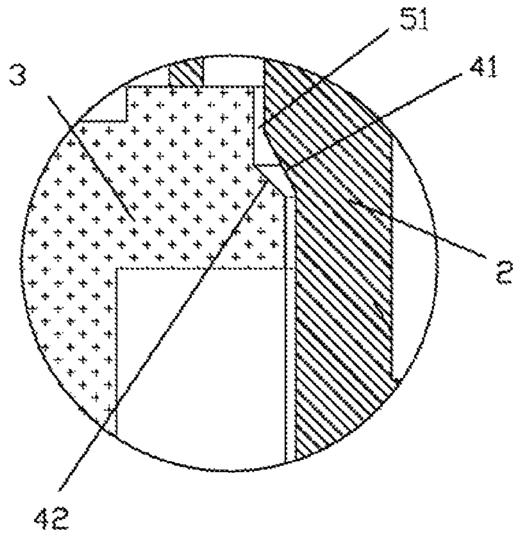
FIG. 23 is an enlarged schematic view of a region H in FIG. 22.

Referring to FIG. 21 to FIG. 23, which show the high-voltage direct current relay capable of improving insulation capability of the present disclosure, and the difference from the first embodiment lies in that the first step surface 41 of the fixed contact 2 and the second step surface 42 of the ceramic cover 3 are both inclined surfaces, and the included angle of the first step surface 41 relative to the horizontal plane and the included angle of the second step surface 42 relative to the horizontal plane are different.

The foregoing is only preferred embodiments of the present disclosure, and is not limitation on the present disclosure in any form. Although the present disclosure has been disclosed as above with preferred embodiments, it is not intended to limit the present disclosure. Any skilled in the art, without departing from the scope of the technical solution of the present disclosure, may make many possible changes and modifications to the technical solution of the present disclosure using the foregoing technical contents disclosed, or modify it into an equalized equivalent embodiment. Therefore, any simple modifications, equivalent changes and modifications made to the above embodiments according to the technical essence of the present disclosure without departing from the contents of the technical solutions of the present disclosure should fall within the protection scope of the technical solutions of the present disclosure.

What is claimed is:

1. A high-voltage direct current relay with improved insulation capability, comprising:

- a ceramic cover;
- two fixed contacts for respectively providing inflow and outflow current; and
- one movable contact spring,
- wherein, the two fixed contacts are respectively mounted at a top wall of the ceramic cover, lower parts of the two fixed contacts respectively extend inside a cavity of the ceramic cover, and two ends of the movable contact spring respectively are fitted with bottom ends of the two fixed contacts,
- the ceramic cover having the top wall and a side wall, a through holes for assembling the fixed contacts are provided at the top wall of the ceramic cover,
- each fixed contact of the two fixed contacts is constituted of a head and a body, and the head of the fixed contact is connected above the top wall of the ceramic cover, and one segment of the body of the fixed contact is inserted into the through hole of the ceramic cover; and
- wherein one segment of the body of the fixed contact is in clearance fitted with the through hole of the ceramic cover, a first step surface downward is provided at an outer peripheral wall of the one segment of the body of the fixed contact, at a corresponding position, a second step surface upward is provided at an inner peripheral wall of the through hole of the ceramic cover, a contour of a projection of one segment of the inner peripheral wall above the second step surface of the through hole of the ceramic cover on a horizontal plane is larger than a contour of a projection of one segment of the outer peripheral wall above the first step surface of one segment of the body of the fixed contact on the horizontal plane, the contour of a projection of one segment of the outer peripheral wall above the first step surface of one segment of the body of the fixed contact on the horizontal plane is larger than a contour of a projection of one segment of the inner peripheral wall below the second step surface of the through hole of the ceramic cover on the horizontal plane, the contour of a projection of one segment of the inner peripheral wall below the second step surface of the through hole of the ceramic cover on the horizontal plane is larger than a contour of a projection of one segment of the outer peripheral wall below the first step surface of one segment of the body of the fixed contact on the horizontal plane, and a distance between the first step surface and the second step surface is larger than zero, so as to prevent arc spatter from entering into a region of fitting clearance between the fixed contact and the through hole of the ceramic cover above a location where the first step surface fits with the second step surface by utilizing staggered fitting between the first step surface and the second step surface.

2. The high-voltage direct current relay with improved insulation capability according to claim 1, wherein the first step surface is integrally formed into one segment of the body of the fixed contact.

3. The high-voltage direct current relay with improved insulation capability according to claim 1, wherein an annular element is embedded in one segment of the body of the fixed contact at a corresponding position, and a bottom surface of the annular element constitutes the first step surface.

4. The high-voltage direct current relay with improved insulation capability according to claim 1, wherein the first step surface and the second step surface are both planes parallel to the horizontal plane.

5. The high-voltage direct current relay with improved insulation capability according to claim 4, wherein a horizontal section of the fixed contact is circular in shape, and a horizontal section of the through hole of the ceramic cover is circular in shape, a diameter of one segment of the inner peripheral wall above the second step surface of the through hole of the ceramic cover is larger than a diameter of one segment of the outer peripheral wall above the first step surface of one segment of the body of the fixed contact, a diameter of one segment of the outer peripheral wall above the first step surface of one segment of the body of the fixed contact is larger than a diameter of one segment of the inner peripheral wall below the second step surface of the through hole of the ceramic cover, a diameter of one segment of the inner peripheral wall below the second step surface of the through hole of the ceramic cover is larger than a diameter of one segment of the outer peripheral wall below the first step surface of one segment of the body of the fixed contact; and a distance between the first step surface and the second step surface is larger than zero.

6. The high-voltage direct current relay with improved insulation capability according to claim 5, wherein one first step surface or a plurality of first step surfaces facing downwards are provided at the outer peripheral wall of one segment of the body of the fixed contact, and diameters of the segments of the outer peripheral wall above each of the first step surfaces gradually decrease from top to bottom; and at positions corresponding to a plurality of first step surfaces, one second step surface or a plurality of second step surfaces are respectively provided in the inner peripheral wall of the through hole of the ceramic cover, and the plurality of second step surfaces are in respective correspondence to the plurality of first step surfaces.

7. The high-voltage direct current relay with improved insulation capability according to claim 1, wherein the first step surface and the second step surface are both inclined surfaces having the same included angles relative to the horizontal plane.

8. The high-voltage direct current relay with improved insulation capability according to claim 7, wherein a horizontal section of the fixed contact is circular in shape, and a horizontal section of the through hole of the ceramic cover is circular in shape, a diameter of one segment of the inner peripheral wall above the second step surface of the through hole of the ceramic cover is larger than a diameter of one segment of the outer peripheral wall above the first step surface of one segment of the body of the fixed contact, a diameter of one segment of the outer peripheral wall above the first step surface of one segment of the body of the fixed contact is larger than a diameter of one segment of the inner peripheral wall below the second step surface of the through hole of the ceramic cover, a diameter of one segment of the inner peripheral wall below the second step surface of the through hole of the ceramic cover is larger than a diameter of one segment of the outer peripheral wall below the first step surface of one segment of the body of the fixed contact; and a distance between the first step surface and the second step surface is larger than zero.

9. The high-voltage direct current relay with improved insulation capability according to claim 8, wherein one first step surface or a plurality of first step surfaces facing downwards are provided at the outer peripheral wall of one segment of the body of the fixed contact, and diameters of the segments of the outer peripheral wall above each of the first step surfaces gradually decrease from top to bottom; and at positions corresponding to a plurality of first step surfaces, one second step surface or a plurality of second step surfaces are respectively provided in the inner peripheral wall of the through hole of the ceramic cover, and the plurality of second step surfaces are in respective correspondence to the plurality of first step surfaces.

10. The high-voltage direct current relay with improved insulation capability according to claim 1, wherein the first step surface and the second step surface are both inclined surfaces, and an included angle between the first step surface and the horizontal plane is different from an included angle between the second step surface and the horizontal plane.

11. The high-voltage direct current relay with improved insulation capability according to claim 10, wherein a horizontal section of the fixed contact is circular in shape, and a horizontal section of the through hole of the ceramic cover is circular in shape, a diameter of one segment of the inner peripheral wall above the second step surface of the through hole of the ceramic cover is larger than a diameter of one segment of the outer peripheral wall above the first step surface of one segment of the body of the fixed contact, a diameter of one segment of the outer peripheral wall above the first step surface of one segment of the body of the fixed contact is larger than a diameter of one segment of the inner peripheral wall below the second step surface of the through hole of the ceramic cover, a diameter of one segment of the inner peripheral wall below the second step surface of the through hole of the ceramic cover is larger than a diameter of one segment of the outer peripheral wall below the first step surface of one segment of the body of the fixed contact; and a distance between the first step surface and the second step surface is larger than zero.

12. The high-voltage direct current relay with improved insulation capability according to claim 11, wherein one first step surface or a plurality of first step surfaces facing downwards are provided at the outer peripheral wall of one segment of the body of the fixed contact, and diameters of the segments of the outer peripheral wall above each of the first step surfaces gradually decrease from top to bottom; and at positions corresponding to a plurality of first step surfaces, one second step surface or a plurality of second step surfaces are respectively provided in the inner peripheral wall of the through hole of the ceramic cover, and the plurality of second step surfaces are in respective correspondence to the plurality of first step surfaces.

13. The high-voltage direct current relay with improved insulation capability according to claim 1, wherein one of the first step surface and the second step surface is a plane parallel to the horizontal plane, and the other of the first step surface and the second step surface is an inclined surface having an included angle relative to the horizontal plane.

14. The high-voltage direct current relay with improved insulation capability according to claim 13, wherein a horizontal section of the fixed contact is circular in shape, and a horizontal section of the through hole of the ceramic cover is circular in shape, a diameter of one segment of the inner peripheral wall above the second step surface of the through hole of the ceramic cover is larger than a diameter of one segment of the outer peripheral wall above the first step surface of one segment of the body of the fixed contact, a diameter of one segment of the outer peripheral wall above the first step surface of one segment of the body of the fixed contact is larger than a diameter of one segment of the inner peripheral wall below the second step surface of the through hole of the ceramic cover, a diameter of one segment of the inner peripheral wall below the second step surface of the through hole of the ceramic cover is larger than a diameter of a segment of the outer peripheral wall below the first step surface of one segment of the body of the fixed contact; and a distance between the first step surface and the second step surface is larger than zero.

15. The high-voltage direct current relay with improved insulation capability according to claim 14, wherein one first step surface or a plurality of first step surfaces facing downwards are provided at the outer peripheral wall of one segment of the body of the fixed contact, and diameters of the segments of the outer peripheral wall above each of the first step surfaces gradually decrease from top to bottom; and at positions corresponding to a plurality of first step surfaces, one second step surface or a plurality of second step surfaces are respectively provided in the inner peripheral wall of the through hole of the ceramic cover, and the plurality of second step surfaces are in respective correspondence to the plurality of first step surfaces.

* * * * *